July 22, 1941.   G. T. McCLURE   2,249,967
AUTOMATIC TRAIN BRAKE CONTROL APPARATUS
Filed Feb. 29, 1940
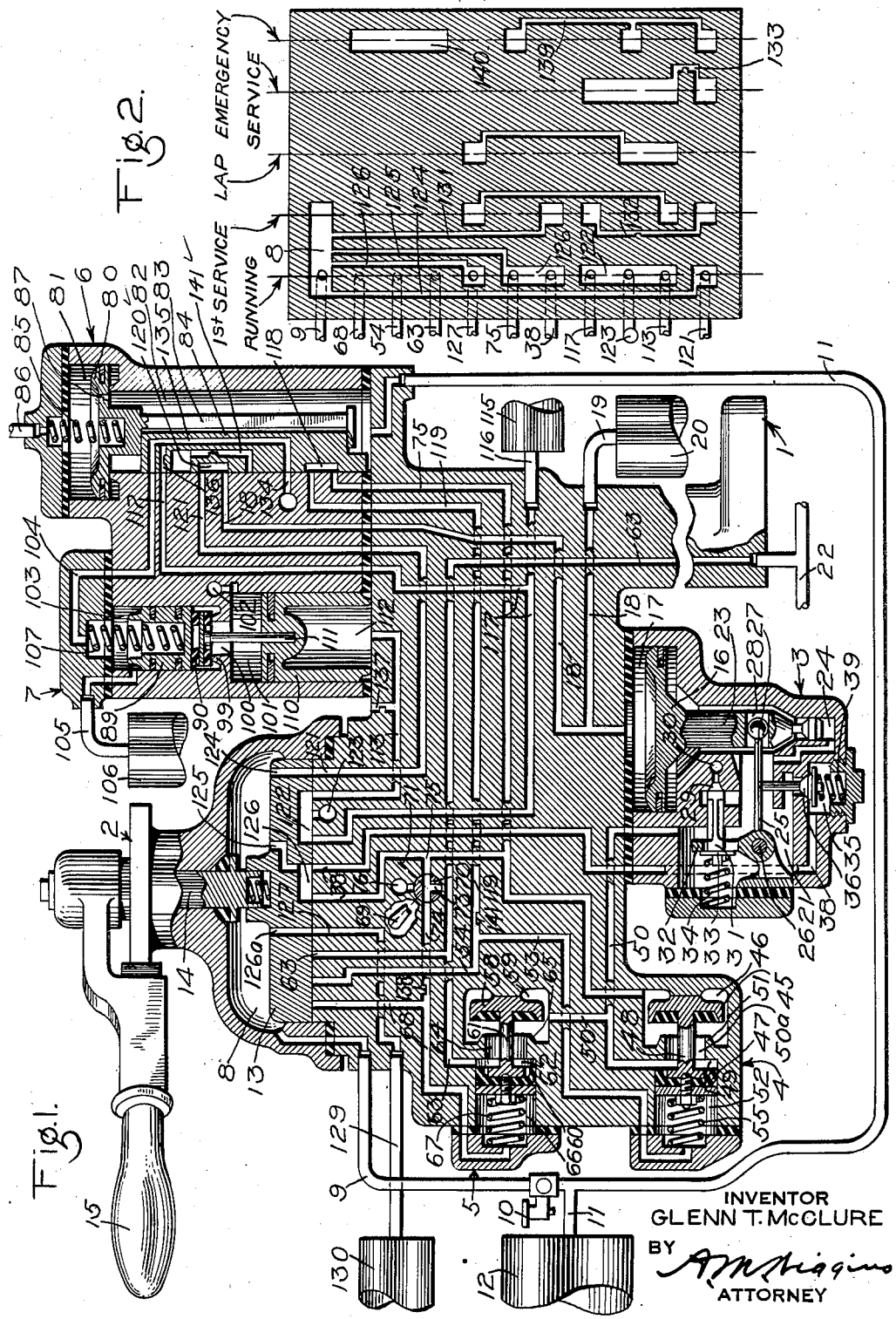
INVENTOR
GLENN T. McCLURE
BY
*A. M. Higgins*
ATTORNEY Patented July 22, 1941

2,249,967

UNITED STATES PATENT OFFICE 2,249,967

AUTOMATIC TRAIN BRAKE CONTROL APPARATUS

Glenn T. McClure, McKeesport, Pa., assignor to The Westinghouse Air Brake Company, Wilmerding, Pa., a corporation of Pennsylvania Application February 29, 1940, Serial No. 321,511

16 Claims. (Cl. 303—14)

This invention relates to railway train control apparatus and more particularly to the type which is operative automatically in response to track signals as governed by traffic conditions to control the brakes on a train.

In Patent 2,159,789, issued to Clyde C. Farmer on May 23, 1939, there is disclosed apparatus of the above type which embodies an engineer's brake valve device operative manually to control the brakes on a train, and with said brake valve device there is associated an application valve device which is adapted to respond to an unfavorable track signal to automatically effect a reduction in brake pipe pressure to apply the brakes on the train.

The brake valve device has the usual running position for supplying fluid under pressure to the brake pipe, a first service position for effecting a limited service reduction in brake pipe pressure to provide for a gradual gathering of the slack in a train upon initiating an application of brakes, the usual lap position, and the usual service and emergency positions for effecting, respectively, service and emergency reductions in brake pipe pressure.

A brake pipe cut-off valve device is also associated with the apparatus for controlling the supply of fluid under pressure to the brake pipe in running position of the brake valve device and is controlled by the application valve device, whereby upon operation of the application valve device in response to an unfavorable track signal to effect a reduction in brake pipe pressure, the cut-off valve device is operated to cut off the supply of fluid under pressure from the brake valve device to the brake pipe.

Recapture means are also provided in the apparatus which permits the engineer upon movement of the brake valve device to first service position to take over the control of a reduction of brake pipe pressure after the reduction has been initiated by operation of the application valve device in response to an unfavorable track condition.

The apparatus further comprises a maintaining valve device controlled by the opposing pressures of the brake pipe and the usual equalizing reservoir and which is operative in the first service position of the brake valve device either during ordinary manual control of the brakes on a train or during manual control of the brakes subsequent to the initiation of a reduction of brake pipe pressure by the application valve device, as just described, to supply fluid under pressure to the brake pipe at a rate to compensate for leakage of fluid under pressure therefrom so that said leakage cannot increase the rate of brake pipe reduction over a desired service rate and cause rough gathering of slack in the train.

In order that the maintaining valve device may supply fluid to the brake pipe even after response of the application valve device to an unfavorable track condition such supply is not controlled by the cut-off valve device, which under this condition is closed due to the application valve device being in its brake applying position.

When a locomotive is used as a second or non-control engine in double heading or as a pusher, a double heading cock is usually provided for preventing the engineer on the non-control locomotive having any control over brake pipe pressure except the ability to effect an emergency reduction therein by movement of the brake valve device to emergency position.

In an apparatus such as disclosed in the above referred to patent, the double heading cock would therefore be so arranged that when turned to its double heading position it would cause the cut-off valve device to close and break communication between the brake pipe and rotary valve in the brake valve device so as to prevent the engineer on the non-control locomotive from having any control over charging the brake pipe and also to prevent the engineer from effecting a service reduction in brake pipe pressure. However, in the double heading position of the double heading cock, the maintaining valve device would still be operative by equalizing reservoir pressure upon a reduction in brake pipe pressure effected either by the engineer or by the application valve device on the control locomotive to supply fluid under pressure to the brake pipe and thus offset to a greater or less degree the venting of fluid under pressure from the brake pipe on the control locomotive and thus make it difficult if not impossible to effect a service application of the brakes on the train. The supply of fluid from the maintaining valve device to the brake pipe cannot however be controlled by the cut-off valve device since such supply is required when the engineer takes over the control of a brake application initiated by the application valve device as above described.

One object of the invention is therefore to provide an improved apparatus of the above type embodying an additional cut-off valve device controlled by a double heading cock and so arranged as to close communication between the maintaining valve device and brake pipe when the double heading cock is turned to double heading position on the non-control locomotive of a train, such as the second locomotive of a double header or a pusher locomotive.

In this improved apparatus there are provided two cut-off valve devices one of which is controlled by the application valve device so as to close the brake pipe supply communication from the brake valve device to the brake pipe but not from the maintaining valve device to the brake pipe upon operation of the application valve device in response to an unfavorable track signal. The function of this one cut-off valve device therefore corresponds substantially to that disclosed in the Farmer patent above referred to. The other cut-off valve device is arranged to close communication between the maintaining valve device and brake pipe when the double heading cock is turned to closed position for double heading. This other cut-off valve device also controls communication between the brake pipe and the rotary valve in the brake valve device so that with the double heading cock in double heading position, the brake valve device can not supply fluid under pressure to the brake pipe or effect a service reduction in brake pipe pressure and thus in any way interfere with the usual release or service control of the brakes on the train by the engineer on the leading or control locomotive. The cut-off valve devices are however so associated with each other and with the brake valve device that movement of the brake valve device to emergency position on the non-control locomotive will effect full opening of both cut-off valve devices to thereby effect a sudden emergency reduction in brake pipe pressure.

Another object of the invention is to provide an improved cut-off valve device so designed and controlled as to ensure full opening thereof upon movement of the brake valve device to emergency position to thereby obtain a brake pipe venting communication between the brake pipe and the rotary valve of the brake valve device having sufficient capacity for reducing the pressure in the brake pipe at an emergency rate.

Other objects and advantages will be apparent from the following more detailed description of the invention.

In the accompanying drawing; Fig. 1 is a diagrammatic sectional view of a portion of a train control apparatus embodying the invention; and Fig. 2 is a diagrammatic, development view of the rotary valve and seat of the brake valve device shown in Fig. 1.

Except for the improvements therein, the apparatus shown in the drawing may be the same as that disclosed in the above referred to Farmer patent and for the sake of simplicity and ease of understanding only those parts are therefore shown and described which are considered essential to a complete and comprehensive understanding of the invention.

DESCRIPTION

As shown in the drawing, the improved apparatus comprises a bracket or pedestal 1 which carries an engineer's brake valve device 2, a combined brake pipe discharge valve mechanism and brake pipe maintaining valve device 3, cut-off valve devices 4 and 5, an automatic train control application valve device 6 and a recapture valve device 7.

The engineer's brake valve device 2 is of conventional structure comprising a casing having a rotary valve chamber 8 connected to a pipe 9 leading to the outlet of a feed valve device 10. The inlet to the feed valve device is connected to a main reservoir pipe 11 which is supplied with fluid under pressure from a main reservoir 12. The feed valve device is adapted to operate to supply fluid from the main reservoir pipe 11 to the pipe 9 and thereby rotary valve chamber 8 at a desired reduced pressure for control of the apparatus, as will be hereinafter described.

A rotary valve 13 is provided in the rotary valve chamber 8 and is connected to one end of an operating key or shaft 14 which extends through the casing and on the outer end thereof there is provided the usual handle 15 which is operable by the engineer for turning the rotary valve 13 to the different brake controlling positions designated in Fig. 2.

The combined brake pipe discharge valve mechanism and brake pipe maintaining valve device comprises a piston 16 having at one side a chamber 17 which is open through a passage 18 and a pipe 19 to the usual equalizing reservoir 20. At the opposite side of equalizing piston 16 there is provided a chamber 21 which is adapted to be connected to a brake pipe 22 through communications which will hereinafter be brought out.

The equalizing piston 16 is provided with a stem 23 extending through the chamber 21 and the lower end of said stem is slidably mounted in a bore 24 in the casing. A bell crank 25 in chamber 21 is pivotally mounted on a pin 26 and has an arm 27 extending into an opening 28 in the equalizing piston stem 23 whereby said piston upon movement is adapted to rock said bell crank.

A brake pipe discharge valve 29 is slidably mounted in a suitable bore in the casing and is provided for controlling communication between the brake pipe chamber 21 and an atmospheric vent passage 30. This valve has an elongated body portion 31 which loosely extends through an opening in the other arm 32 of bell crank 25 and on the outer end of said body there is provided a head 33 for engagement by said arm whereby said arm is operable to unseat the discharge valve 29 upon rocking of the bell crank 25 by movement of the equalizing piston 16 in an upwardly direction. A spring 34 acts on the head 33 for urging the discharge valve 29 to its normal closed position when the bell crank 25 is in its normal position shown.

Directly below the bell crank arm 27 the casing has a chamber 35 containing a maintaining valve 36. This valve has a stem extending through an opening connecting chamber 35 to the brake pipe chamber 21 and into substantial engagement with the bell crank arm 27 when in its normal position shown. The chamber 35 is connected to a passage 38 which leads to the seat of rotary valve 13 and in said chamber there is provided a spring 39 acting on the valve 36 for urging it to its normal seated position shown.

The cut-off valve device 4 comprises a poppet valve 45 contained in the chamber 46 and a piston 47 connected by a stem 48 to said poppet valve for actuating same. The stem extends through a chamber 49 which is connected by a passage 50 to the brake pipe chamber 21 and through an opening 50a connecting said chamber to chamber 46, and encircling said opening within the chamber 46 is an annular seat rib 51 adapted to be engaged by the valve 45 for closing communication between said chambers. The piston 47 is open at one face to chamber 49 and at the opposite side of the piston there is provided a chamber 52 which is connected by passages 53 and 54 to the seat of rotary valve 13. A spring 55 in chamber 52 acts on the piston 47 for biasing same in the direction to unseat cut-off valve 45.

The cut-off valve device 5 is similar in construction to the cut-off valve device 4 and comprises a cut-off valve 58 contained in a chamber 59 which is open to passage 50 and a piston 60 which is connected by a stem 61 to said valve for controlling same. The stem 61 extends through a chamber 62, which is in permanent communication with the brake pipe 22 through a passage 63, and through an opening 64 connecting said chamber to the valve chamber 59. In chamber 59 there is provided an annular seat 65 encircling the opening 64 for engagement by the valve 58 to close communication between the chamber 59 and chamber 62. At the opposite face of piston 60 there is provided a chamber 66 containing a spring 67 acting on the piston 60 for urging same in the direction to unseat the cut-off valve 58. The chamber 66 is connected to the passage 68 which also leads to the seat of rotary valve 13.

A double heading cock is provided which comprises a plug valve 70 rotatably mounted in a suitable seat in the casing. A handle 69 is provided for turning the valve 70 from a normal position shown to a double heading position, indicated by the numeral 71.

The plug valve 70 is provided with a T-shaped waterway 73 adapted in the normal position of the valve to establish communication between a passage 74 at one side of the valve and a passage 75 at the opposite side of the valve, the passage 75 leading to the cut-off valve chamber 46 and to the seat of rotary valve 13. In the double heading position of the plug valve 70 the communication just described is adapted to be closed and the waterway 73 in said valve is adapted to connect passage 74 to an atmospheric vent passage 76.

The automatic train control application valve device 6 comprises a piston 80 having at one side a chamber 81 and at the opposite side a chamber 82 which is supplied at all times with fluid from the main reservoir 12 through pipe 11. The piston 80 is provided with a stem 83 extending into chamber 82 and said stem is suitably recessed to receive a slide valve 84 adapted to be moved by and with the piston 80. The piston chamber 81 contains a bias spring 85 acting on the piston for urging said piston and the slide valve 84 to their normal positions shown, and said chamber is connected to a pipe 86 which is adapted to be connected to means (not shown) controlled by changes in signal indication along a trackway.

When the track signal is favorable the signal controlled means just referred to is adapted to close a vent from the pipe 86 so that said pipe and thereby the piston chamber 81 may be charged with fluid at the same pressure as acting in valve chamber 82 by way of a restricted charging port 87 provided through the piston 80. In case the track signal becomes unfavorable the signal controlled means referred to is adapted to vent pipe 86 and thereby vent fluid under pressure from the piston chamber 81 so that fluid at main reservoir pressure acting in the valve chamber 82 will move the piston 80 and thereby the slide valve 84 from their normal position shown to an application position for effecting an automatic application of the brakes on the train. The application position may be defined by engagement of piston 80 with the end wall of chamber 81. When the signal condition again becomes favorable the piston chamber 81 will again be charged with fluid under pressure through the port 87 and spring 85 will then move the piston 80 and slide valve 84 back to their normal position. A further description of the control of the application piston 80 and slide valve 84 is not considered essential in the present application.

The recapture valve device 7 comprises a valve piston 89 one end of which constitutes a valve 90 for engagement with an annular seat rib 99 which encircles an opening 100 leading to a bore 101 that is constantly open to the atmosphere through a vent port 102. The face of the valve piston 89 opposite the valve 90 is open to a chamber 103 which is connected by a passage 104 to the seat of slide valve 84 of the application valve device 6. The chamber 103 is also open to a passage 105 which leads to a second reduction reservoir 106, the opening of said passage to chamber 103 being so arranged as to be closed by the piston 89 upon movement thereof from the normal position shown into sealing engagement with the upper end of chamber 103. A spring 107 in chamber 103 acts on the valve piston 89 for normally urging same into engagement with the seat rib 99.

In the bore 101 there is provided a piston 110 which is connected with the valve piston 89 by a pin 111 extending through the opening 100. The piston 110 is open at one side to chamber 101 which is vented to the atmosphere through passage 102 and has at the opposite side a chamber 112 which is connected to a passage 113 leading to the seat of rotary valve 13.

A first reduction reservoir 115 is connected by a pipe 116 to a passage 117 which leads to the seat of rotary valve 13 and also to the seat of slide valve 84. In slide valve 84 there is provided a port 135 which in the normal position of said valve, connects the second reduction reservoir passage 104 to a vent port 134. The slide valve also has a restricted port 136 connecting the first reduction reservoir passage 117 to port 135. Both reduction reservoirs will be thus normally at atmospheric pressure. The slide valve 84 has a cavity 118 which in the normal position of said valve connects passage 75 to a passage 119 which leads to the passage 54. The slide valve 84 also has a cavity 120 which in the normal position of said valve connects passage 18 from the equalizing discharge valve piston chamber 17 and equalizing reservoir 20 to a passage 121 which leads to the seat of rotary valve 13.

With the rotary slide valve 13 in running position shown, the passages 68, 54 and 63 are lapped thereby while the passages 117 and 113 are open to the atmosphere by way of a cavity 122 in said valve and an atmospheric passage 123 in the valve seat. With the rotary valve 13 in running position a port 124 through said valve connects the valve chamber 8 to passage 121. A port 125 in the rotary valve connects the valve chamber 8 to a cavity 126 in the seating face of the rotary valve, said cavity registering with passages 75 and 38. There is also provided a port 126a in rotary valve 13 which in running position thereof connects chamber 8 to a passage 127 which leads to a pipe 129 connected to a suppression reservoir 130.

OPERATION

Initial charging

In order to initially condition the apparatus for operation, fluid under pressure is supplied in the usual manner to the main reservoir 12 and from thence flows to pipe 11 leading to the feed valve device 10 and to valve chamber 82 in the train control application valve device 6. From valve chamber 82 fluid under pressure flows through the restricted port 87 to piston chamber 81, and assuming that the means (not shown) controlled by track signals is in condition to permit the train to operate, the fluid pressure in chamber 81 and pipe 86 equalizes with that in valve chamber 82 and thus permits the spring 85 to hold the application piston 80 and slide valve 84 in their normal position shown.

The feed valve device 10 operates in the usual manner to supply fluid from pipe 11 to pipe 9 at the reduced pressure desired for use in the control of brakes on the train, and fluid thus supplied to pipe 9 flows to rotary valve chamber 8 in the brake valve device. With the brake valve handle 15 and thereby rotary valve 13 in their normal or running position shown, fluid supplied to rotary valve chamber 8 flows through port 126a to passage 127 and thence to the suppression reservoir 130 charging same. Fluid under pressure from the rotary valve chamber 8 also flows through port 125 and cavity 126 to passage 38 leading to the maintaining valve chamber 35 and from said cavity to passage 75 leading to the cut-off valve chamber 46 and to cavity 118 in the slide valve 84. From cavity 118 fluid flows through passages 119 and 53 to piston chamber 52 in the cut-off valve device 4. The pressure of fluid obtained in chamber 52 acting on the piston 47 in conjunction with spring 55 then urges the piston 47 to the position shown as a consequence of which the cut-off valve 45 is opened which permits fluid supplied to chamber 46 to flow to chamber 49 and thence through passage 50 to the cut-off valve chamber 59 and also to chamber 21 in the combined equalizing discharge valve mechanism and maintaining valve device 3.

Fluid supplied through cavity 126 in rotary valve 13 to passage 75 also flows to passage 68 and thence to piston chamber 66 in the cut-off valve device 5 and therein acts in conjunction with spring 67 on the piston 60 to position said piston as shown and thereby unseat the cut-off valve 58. With the cut-off valve 58 thus unseated fluid at feed valve pressure supplied past the cut-off valve 45 to passage 50 flows through the cut-off valve chamber 59 to chamber 62 and thence through passage 63 to the brake pipe 22 for charging said brake pipe with fluid at the pressure supplied by the feed valve device 10.

At the same time as the brake pipe 22 is thus charged with fluid supplied by the feed valve device 10, fluid at the same pressure also flows from the rotary valve chamber 8 through port 124 and passage 121 to cavity 120 in the slide valve 84. From cavity 120 this fluid flows to passage 18 and thence to the equalizing piston chamber 17 and to the equalizing reservoir 20 charging said chamber and reservoir with fluid at the pressure supplied by the feed valve device 10. It will thus be noted that the equalizing piston 16 is subject in chamber 17 to equalizing reservoir pressure and in chamber 21 to the opposing pressure of fluid in the brake pipe, and since these pressures are equal at this time said piston is in a floating condition which permits spring 34 to hold the brake pipe discharge valve 29 seated and spring 39 to hold the maintaining valve 36 seated.

The apparatus is now in condition for controlling the brakes on the train either by operation of handle 15 by the engineer or by operation of the application valve device 6 in response to an unfavorable track signal.

Application of brakes by engineer

With the apparatus conditioned as above described and operating under favorable traffic conditions with a clear signal, if the engineer desires to effect a service application of the brakes he operates the brake valve handle 15 to turn rotary valve 13 from the running position shown and above described to first service position.

In first service position, passage 75 is lapped by rotary valve 13 to cut off further supply of fluid under pressure to the brake pipe 22 by way of cut-off valve devices 4 and 5, and at the same time passage 121 which is connected through slide valve 84 to the equalizing piston chamber 17 and equalizing reservoir 20 is connected by a passage 132 (Fig. 2) in the rotary valve to passage 117 leading to the first reduction reservoir 115. The fluid under pressure in equalizing piston chamber 17 and in the equalizing reservoir 20 then equalizes at a service rate into the first reduction reservoir 115 thereby reducing the pressure acting above the equalizing piston 16 to a degree below brake pipe pressure acting below said piston in chamber 21. As a result, the higher brake pipe pressure in chamber 21 shifts the piston 16 in an upwardly direction and thereby actuates the bell crank 25 to pull the discharge valve 29 away from its seat. With the discharge valve thus unseated fluid under pressure is permitted to flow from the brake pipe 22 to the atmosphere by way of passage 63, past the cut-off valve 58, through passage 50, to chamber 21 and then past said discharge valve to thereby effect a service rate of reduction in brake pipe pressure for initiating a service application of brakes on the train.

The venting of fluid under pressure from the brake pipe past the discharge valve 29 continues as just described until the brake pipe pressure in chamber 21 is reduced sufficiently with respect to equalizing reservoir pressure acting in chamber 17 to permit movement of the equalizing piston 16 and bell crank 25 back to their normal positions which permits spring 34 to seat the brake pipe discharge valve 29 and thereby limit the reduction in brake pipe pressure to that effected in the equalizing reservoir.

The first reduction reservoir 115 is of such volume with respect to that of equalizing reservoir 20 and equalizing piston chamber 17 as to provide a relatively small reduction in equalizing reservoir pressure and thereby in brake pipe pressure, such for example as eight or ten pounds from a normal 70 pounds, which will apply the brakes on the train with sufficient intensity to cause the slack in the train to gently gather.

After the slack in the train has been gathered by the initial relatively light reduction in brake pipe pressure effected as above described, the engineer may then operate the brake valve handle 15 to turn the rotary valve handle 13 to service position in which the equalizing reservoir 20 and equalizing piston chamber 17 are connected directly to the atmospheric port 123 through a passage 133 (Fig. 2) in the rotary valve. A further service reduction in the fluid pressure acting above equalizing piston 16 then occurs and said piston responds to such reduction and again rocks the bell crank 25 to unseat the discharge valve 29 and effect a further and corresponding reduction in brake pipe pressure and thus an increased degree of brake application on the train.

The engineer may leave the rotary valve 13 in the service position until the pressure in the equalizing reservoir 20 and equalizing piston chamber 17 is reduced to a desired degree depending upon the degree of brake application desired and then operate the handle 15 to turn the rotary valve 13 back to lap position in which communication between passage 121 and the atmospheric exhaust port 123 is closed so as to prevent further reduction in pressure above the equalizing discharge valve piston 16. The equalizing piston 16 will however maintain the discharge valve 29 unseated until the brake pipe pressure in chamber 21 is reduced sufficiently with respect to the reduced equalizing reservoir pressure in chamber 17 to permit movement of the piston 15 in a downwardly direction for operating the bell crank 25 to close the discharge valve 29 and thus terminate the venting of fluid from the brake pipe. In this manner the equalizing discharge valve mechanism controlled by the piston 16 will act to reduce the pressure in brake pipe 22 to a degree corresponding to the reduced pressure in the equalizing reservoir 20 and as will be evident, the engineer may, by limiting the degree of reduction in equalizing reservoir pressure, obtain any desired degree of reduction in brake pipe pressure and thus any desired degree of brake application on the train.

The apparatus will operate as above described in effecting a service application of brakes only if leakage of fluid under pressure from the brake pipe is at a rate which is less than the service rate of reduction in pressure in the equalizing reservoir. In case the brake pipe leakage exceeds the service rate of reduction in equalizing reservoir pressure, such leakage will tend to reduce brake pipe pressure below the equalizing piston at a rate exceeding the service rate of reduction in equalizing reservoir pressure above said piston and the differential in opposing pressures which will be thus established on the equalizing piston will move same downwardly and actuate the bell crank 25 to unseat the maintaining valve 36.

In first service position of rotary valve 13 fluid under pressure is supplied from the rotary valve chamber 8 through a port 131 (Fig. 2) in the rotary valve and passage 38 to the maintaining valve chamber 35, so that in case the maintaining valve 36 is unseated as just described fluid under pressure will be supplied to the brake pipe. As will be apparent, the equalizing piston will operate to unseat the maintaining valve only sufficient to supply fluid to the brake pipe at a rate to compensate for brake pipe leakage and prevent the brake pipe pressure reducing at a rate exceeding the service rate of reduction in equalizing reservoir pressure.

Thus, a gentle gathering of slack in the train is assured even in case of excessive brake pipe leakage. After the slack has been gathered however, there is no further need to supply fluid to the brake pipe to compensate for brake pipe leakage, so that in the service and lap positions of the brake valve device employed in effecting the further reduction in brake pipe pressure, passage 38 leading to the maintaining valve chamber 35 is lapped by the rotary valve 13.

In effecting a service application of the brakes as just described it will be noted that the application is effected in two stages, that is, first a light application of brakes is effected to cause a gentle gathering of the slack in the train and then after the slack is gathered the degree of application is increased as required to provide the desired retardation of the train.

In order to release the brakes after an application effected in the manner just described the engineer may operate the handle 15 to turn rotary valve 13 back to running position in which the brake pipe and equalizing reservoir are recharged with fluid under pressure, as hereinbefore described.

*Application of brakes in response to change in signal indication*

If when the brakes on the train are released the traffic conditions become unfavorable, the consequent change in signal indication acts to effect venting of fluid under pressure from the application piston chamber 81 through pipe 86, and as a result the pressure in the valve chamber 82 moves the piston 80 and thereby the slide valve 84 from their normal position shown to their application position above described.

In the application position of slide valve 84 cavity 118 therein connects the passage 119 to the atmospheric vent passage 134 and thus vents fluid under pressure from piston chamber 52 of the cut-off valve device 4 to the atmosphere which permits brake pipe pressure acting in chamber 49 to move the piston 47 in a direction to pull the cut-off valve 45 into engagement with seat rib 51 thereby cutting off the supply of fluid under pressure from the rotary valve 13 to the brake pipe 22.

At the same time as the supply of fluid to the brake pipe is thus cut off, a port 141 in slide valve 84 connects the equalizing reservoir passage 18 to passages 117 and 104 leading, respectively, to the first reduction reservoir 115 and to the second reduction reservoir 106 and through this communication fluid pressure flows from the equalizing discharge valve piston chamber 17 and equalizing reservoir 20 at a service rate. When the equalizing reservoir pressure is reduced as just described the equalizing discharge valve mechanism operates as hereinbefore described to vent fluid under pressure from the brake pipe 22 for effecting a corresponding service reduction in pressure therein.

In case of excessive leakage of fluid under pressure from the brake pipe the maintaining valve 36 will operate at this time to supply fluid under pressure to the brake pipe to compensate for such leakage, as will be apparent, it being noted that communication between the brake pipe and the discharge valve 29 and maintaining valve 36 is by way of the open cut-off valve 58 of the cut-off valve device 5. As a result of this reduction in brake pipe pressure a service application of the brakes on the train is automatically obtained.

It will be noted that passage 117 to which the reduction limiting reservoirs 115 and 106 are connected when the slide valve 84 is in application position is open to the atmosphere through cavity 122 in rotary valve 13 when the brake valve handle 15 is in running position and, as a result, unless said handle is moved out of running position a complete and continuous venting of fluid under pressure from the equalizing reservoir 20 will occur and the discharge valve mechanism will consequently operate to effect a complete venting of fluid under pressure from the brake pipe and thereby insure a full service application of brakes.

A complete venting of fluid under pressure from the brake pipe as just described is unnecessary and undesirable since a full service application of brakes is obtained upon a full service reduction in brake pipe pressure, so that any further reduction is merely a waste of air which requires replacement before a release of the brakes can be effected.

The engineer may prevent a complete venting of fluid under pressure from the brake pipe upon operation of the application valve device 6, as just described, by operating the brake valve handle to turn rotary valve 13 to lap position for closing communication between passage 117 and the atmospheric vent passage 123 in the seat of rotary valve 13. The reduction in equalizing reservoir pressure then effected by operation of application valve device 6 will be limited to equalization into the first and second reduction reservoirs 115 and 106, respectively, and these reservoirs are so proportioned to the volume of the equalizing reservoir 20 that upon equalization of the pressures therein a full service reduction in equalizing reservoir pressure will be effected and as a consequence the equalizing discharge valve mechanism 3 will operate to limit the reduction in brake pipe pressure to a corresponding full service degree.

It will be noted that when the brakes are applied due to automatic operation of the application valve device 6 the reduction in pressure in the equalizing reservoir 20 is continuous regardless of the position which rotary valve 13 may occupy. In other words the application of brakes is not effected in two stages with an intervening time interval to provide for the gentle gathering of slack in the train as when the application is effected by manual movement of the brake valve handle 15 first to the first service position and then to service position above described.

*Recapture of application of brakes initiated by operation of application valve device 6*

The engineer may however, if he is alert, prevent a straight away or continuous application of brakes by operation of the application valve device 6 as just described, by moving the brake valve handle to first service position promptly after movement of the application piston 89 and slide valve 84 to their application position, as will now be described.

If after movement of the application piston 89 and slide valve 84 to their application positions the engineer promptly operates the brake valve handle 15 to turn the rotary valve 13 to first service position the suppression reservoir 130, charged with fluid under pressure in running position of rotary valve 13, is connected to passage 113 so that fluid under pressure from said reservoir is supplied to chamber 112 below piston 110 to operate said piston to move the valve piston 89 to its upper position so as to disconnect the second reduction reservoir 106 from passage 104. As a result, the fluid vented from the equalizing reservoir 20 through the application slide valve 84 can flow only to the first reduction reservoir 115 and since the passage 117 through which this flow occurs is lapped by rotary valve 13 in first service position of the rotary valve the reduction in pressure in the equalizing reservoir 20 is therefore limited to equalization into the first reduction reservoir 115. As a result, a relatively small reduction in equalizing reservoir pressure will occur and a corresponding light reduction in brake pipe pressure will be effected by operation of the discharge valve mechanism to cause a gentle gathering of the slack in the train, it being noted that the maintaining valve 36 is also operative under this condition in case of excessive brake pipe leakage to supply fluid under pressure to the brake pipe to offset such leakage, as hereinbefore described.

In the first service position of rotary valve 13 the fluid supplied from the suppression reservoir 130 for operating the recapture piston 110 to hold the valve piston 89 in its upper position is gradually vented to the atmosphere through a restricted vent passage 137, the flow capacity of which is so related to the volume of the suppression reservoir 130 as to maintain sufficient pressure in chamber 112 for holding the valve piston 89 in its upper position against spring 107 for a period of time which will insure the general gathering of slack in the train. By the end of this period of time the pressure in piston chamber 112 will become sufficiently reduced through the vent passage 137 to permit the spring 107 to move the valve piston to its lower position shown and thus connect the second reduction reservoir 106 to passage 104 as a result of which the pressure in equalizing reservoir 20 and in the first reduction reservoir 115 will equalize into the second reduction reservoir 106 and effect a further and full service reduction in pressure in the equalizing reservoir 20 and equalizing piston chamber 17. The equalizing discharge valve mechanism 3 will then operate to increase the degree of reduction in brake pipe pressure to a full service reduction for thereby effecting a full service application of the brakes on the train.

There is no need for supplying fluid from the brake pipe to offset leakage therefrom after the slack in the train has been gathered due to the first reduction in brake pipe pressure so that following said first reduction the engineer may operate the brake valve handle 15 to turn the rotary valve 13 out of first service position to lap position and thereby cut off the supply of fluid under pressure to the maintaining valve chamber 35, so that even though the maintaining valve 36 will be unseated while effecting the second reduction in brake pipe pressure there will be no supply of fluid to the brake pipe at this time by way of said maintaining valve.

It will be noted that the cut-off valve 45 of the cut-off valve device 4 is closed during an automatic application of brakes effected by operation of the application valve device 6 but this valve has no control over communication between the brake pipe 22 and chamber 21 in the combined equalizing discharge valve mechanism and maintaining valve device 3.

Communication between brake pipe 22 and chamber 21 is however controlled by the cut-off valve 58 in the cut-off valve device 5 but said valve is maintained fully open during a train control application of the brakes due to the fact that passage 75 is lapped by the slide valve 84 and either open to the rotary valve chamber 8 or lapped by the rotary valve 13 in all positions except emergency, so that under these conditions the pressure in piston chamber 66 is maintained while brake pipe pressure at the opposite side of the piston 60 is reduced. A differential of fluid pressures is thereby provided on the cut-off valve piston 60 which acting in conjunction with spring 67 insures that the cut-off valve 58 will be maintained in a fully open position while effecting a train control application of the brakes.

Full opening of the cut-off valve 58 in the cut-off valve device 5 is also insured when effecting a service application of the brakes by operation of the brake valve handle 15, as hereinbefore described, due to the fact that the reduction in brake pipe pressure in chamber 62 at one side of the piston 60 effected through passage 50 by operation of discharge valve 29 leads the reduction in pressure at the opposite side of said piston in chamber 66, which occurs through passages 68, 74, port 73 in the double heading plug valve 70, passage 75 and through the cut-off valve chamber 46 and passage 50. If desired, a choke 138 may even be provided in passage 74 to further delay the reduction in pressure in chamber 66 under this condition to thereby provide an increased differential of fluid pressures on piston 60 for acting in conjunction with spring 67 to hold the cut-off valve 68 fully open.

Emergency application of brakes

An emergency reduction in pressure in the brake pipe 22 may be effected at any time upon operation of the brake valve handle 15 to turn rotary valve 13 to emergency position for thereby connecting passage 75 through an emergency cavity 139 in the rotary valve (Fig. 2) to the atmospheric vent port 123 in the rotary valve seat. With passage 75 thus open to the atmosphere a direct emergency vent communication is established between the brake pipe and atmosphere through passage 63, past the cut-off valve 58 of the cut-off valve device 5, thence through passage 50, chamber 49 of the cut-off valve device 4 and from chamber 49 past the cut-off valve 45 to passage 75, and this communication has sufficient capacity with the cut-off valves 58 and 49 fully open to reduce the pressure in brake pipe 22 at an emergency rate for effecting an emergency application of the brakes.

In order to insure that the cut-off valves 58 and 45 in the cut-off valve devices 5 and 4, respectively, will be fully open to provide for the emergency venting of fluid under pressure past said valves to effect an emergency reduction in brake pipe pressure as just described, a cavity 140 (Fig. 2) is provided in the rotary valve adapted in emergency position of said rotary valve to connect piston chambers 66 and 52 of said devices to the brake pipe passage 63 at the brake pipe side of the cut-off valve devices, while chambers 62 and 49 at the opposite sides of the cut-off valve pistons 60 and 47, respectively, are open to the emergency passage 75. The pressure in chambers 66 and 52 will therefore be maintained substantially equal to that in the brake pipe passage 63 ahead of the cut-off valve devices while the pressure at the opposite sides of the cut-off valve pistons will be reducing rapidly by flow to the vented passage 75, due to which the pressure of fluid in chambers 62 and 49 can not exceed that in chambers 66 and 52 so as to thereby insure that the cut-off valves 58 and 45 will be held in their fully open position by at least the pressure of springs 67 and 55, respectively.

The choke 138 acts under the condition just described to limit the venting of fluid from the cut-off valve piston chamber 66 to the vent passage 75 to such a degree that the pressure in said chamber will remain substantially equal to that in the brake pipe passage 63 as just described, while a choke 141 acts in a like manner to limit venting of fluid under pressure from the cut-off valve piston chamber 52 through the application slide valve 84 to the vented passage 75 when said slide valve is in its normal position shown.

In case the brake valve device is operated to effect an emergency reduction in brake pipe pressure subsequent to response of the application valve device 6 to an unfavorable track signal and in which case the cut-off valve 45 of the cut-off valve device 4 will be closed, said valve will be promptly opened by fluid pressure supplied from the brake pipe passage 63 to piston chamber 52 and the choke 141 will in this case act to limit venting of fluid under pressure from said chamber through the application slide valve 84 to the atmospheric vent passage 134 to such a degree that said pressure will substantially equal that in passage 63 so as to insure that the valve 45 will be held fully open by spring 55.

It will thus be seen that while the purpose of the cut-off valve device 4 is to cut off the supply of fluid under pressure to the brake pipe when an application of brakes is effected by operation of the brake application valve device 6, full opening of said cut-off valve is promptly obtained upon movement of the brake valve handle 15 to emergency position to provide for emergency venting of fluid under pressure from the brake pipe 22 to effect an emergency application of the brakes. Under all brake control conditions above described the cut-off valve device 5 remains in the open position shown. The purpose of the cut-off valve device 5 is to close communication between chamber 21 in the combined equalizing discharge valve mechanism and maintaining valve device 3 and the brake pipe 22 on the second or non-control engine of a double header or on a pusher engine as will now be described.

Cut-out of brake control on non-control locomotive

When an engine is operated as the second or non-control engine in double heading or as a pusher engine it is desired that the engineer thereon, shall have no control over either the supply of fluid under pressure to the brake pipe or the effecting of a service reduction in brake pipe pressure and it is also desired that the automatic control apparatus on such locomotive be rendered non-responsive to a change in track signals. Accordingly, means (not shown) are provided for closing the vent communication through pipe 86 so that the application valve device 6 will remain in its normal position and not be responsive to a change in signal indication. Also on such a locomotive the plug valve 70 in the double heading cock is turned to double heading position in which the waterway 73 connects passage 74 to the atmospheric vent passage 76, this position being indicated by the dotted line bearing the reference numeral 71.

In this double heading position of the plug valve 70 piston chamber 66 of the cut-off valve device 5 is vented directly to the atmosphere through passage 68, passage 74, port 73 in the plug valve and the atmospheric passage 76, so that brake pipe pressure acting in chamber 62 at the opposite side of the cut-off valve piston 60 will effect movement of said piston against spring 67 and close the cut-off valve 58. With the cut-off valve 58 thus closed fluid cannot be supplied to the brake pipe 22 through the rotary valve 13 or by operation of the maintaining valve 36 and a service reduction in brake pipe pressure cannot be effected, as hereinbefore described in case the brake valve handle 15 is inadvertently turned to any of its different positions except emergency.

Without the cut-off valve 58 for closing communication between the brake pipe passage 63 and chamber 21 in the combined equalizing discharge valve mechanism and maintaining valve device 3 it will be noted that with the equalizing reservoir 29 and equalizing piston chamber 17 charged with fluid under pressure through the rotary valve 13 in the running position on a non-control locomotive, a reduction in brake pipe pressure effected by operation of the apparatus on the control locomotive would be effective in chamber 21 below the equalizing discharge valve piston 16 and would permit equalizing reservoir pressure at the opposite side of said piston to urge said piston in a downwardly direction to unseat the maintaining valve 36 and thus supply fluid under pressure to the brake pipe. This supply of fluid under pressure to the brake pipe would occur at the same time as the engineer on the control locomotive was attempting to effect a reduction in brake pipe pressure and would tend to maintain the pressure in the brake pipe equal to the normal equalizing reservoir pressure on the non-control locomotive and prevent obtaining application of the brakes on the train. This would be a dangerous condition but is avoided in the present apparatus by the cut-off valve 58 as above described.

It is desirable however that the engineer on the non-control locomotive be able to effect an emergency reduction in brake pipe pressure at any time in order to insure the safety of a train, and this is provided for upon movement of rotary valve 13 to emergency position even though the cut-off valve 58 in the cut-off valve device 5 is closed on the non-control locomotive, as will now be brought out.

If the engineer on the non-control locomotive desires to effect an emergency application of the brakes the brake valve handle 15 is operated to turn rotary valve 13 to emergency position in which, as hereinbefore described, the brake pipe passage 63 is connected to the passages 68 and 54 leading to the cut-off valve piston chamber 66 and 52, respectively. At this time passage 68 is open through choke 138, passage 74 and plug valve 70 to the atmospheric vent port 76 but the venting capacity of choke 138 is so limited with respect to the rate at which fluid is supplied from the brake pipe passage 63 as to insure at least equalization of pressures on the opposite sides of the cut-off valve piston 69 so that the spring 67 acting on said piston will move the cut-off valve 58 to and hold same in its wide open position. Likewise, and as hereinbefore described, choke 141 insures that the supply of fluid under pressure from brake pipe passage 63 through passage 53 to the cut-off valve piston chamber 52 will provide a pressure in said chamber at least equal to that in chamber 49 at the opposite side of the cut-off valve piston 47 so as to thereby insure that spring 55 acting on said piston will hold the cut-off valve 45 in its wide open position. The emergency vent communication is thereby established from brake pipe 22 past the cut-off valves 58 and 45 to passage 75 leading to the rotary valve 13 which in emergency position connects the passage 75 to the atmospheric vent passage 123 thereby insuring that the brake pipe pressure will be vented at the desired emergency rate to effect an emergency application of brakes on the train.

When it is desired to release the brakes after an emergency application effected by the engineer on the non-control locomotive, the handle 15 of the brake valve device is operated to turn the rotary valve 13 back to running position in which the cut-off valve device 5 again closes. The brake pipe 22 may then be recharged with fluid under pressure by operation of the apparatus on the control locomotive and a release of the brakes on the train will thereby be effected.

Summary

From the above description it will be noted that the cut-off valve device 5 under the control of double heading plug valve 70 provides for the use of the apparatus on a non-control locomotive in double heading or in pusher service without interference with the usual control of service application and release of brakes from the control locomotive, and also permits effecting an emergency application of the brakes on the train from the non-control locomotive in case such is desired. It will also be noted that the control of both cut-off valve devices is so arranged as to insure full opening thereof upon movement of the brake valve handle 15 to emergency position so as to provide for venting of fluid under pressure from the brake pipe 22 to the atmosphere at an emergency rate whenever the brake valve device is moved to emergency position.

While one illustrative embodiment of the invention has been described in detail, it is not the intention to limit the scope to that embodiment or otherwise than by the terms of the appended claims.

Having now described my invention, what I claim as new and desire to secure by Letters Patent is:

1. In a locomotive brake equipment, in combination, a brake pipe, a brake valve device for supplying fluid under pressure to said brake pipe, an equalizing reservoir, a valve mechanism controlled by the opposing pressures in said equalizing reservoir and brake pipe and operative upon a reduction in equalizing reservoir pressure below brake pipe pressure to effect a corresponding reduction in brake pipe pressure and operative to supply fluid under pressure to said brake pipe if brake pipe pressure reduces below that in said equalizing reservoir, valve means controlling communication through which fluid is adapted to be supplied from said brake valve device to said brake pipe but not from said mechanism to said brake pipe and operative upon an unfavorable track signal to close said communication and to effect a reduction in equalizing reservoir pressure, and other valve means controlling communication through which fluid is adapted to be supplied from said valve mechanism to said brake pipe and conditionable manually to close same.

2. In a locomotive brake equipment, in combination, a brake pipe, a brake valve device for supplying fluid under pressure to said brake pipe, an equalizing reservoir, a valve mechanism controlled by the opposing pressures in said equalizing reservoir and brake pipe and operative upon a reduction in equalizing reservoir pressure below brake pipe pressure to effect a corresponding reduction in brake pipe pressure and operative to supply fluid under pressure to said brake pipe if brake pipe pressure reduces below that in said equalizing reservoir, valve means controlling communication through which fluid is adapted to be supplied from said brake valve device to said brake pipe but not from said mechanism to said brake pipe and operative upon an unfavorable track signal to close said communication and to effect a reduction in equalizing reservoir pressure, and other valve means controlling said communication and also communication through which fluid is adapted to be supplied by said valve mechanism to said brake pipe and conditionable manually to close both of the communications.

3. In a locomotive brake equipment, in combination, a brake pipe, a brake valve device for supplying fluid under pressure to said brake pipe, an equalizing reservoir, a valve mechanism controlled by the opposing pressures in said equalizing reservoir and brake pipe and operative upon a reduction in equalizing reservoir pressure below brake pipe pressure to effect a corresponding reduction in brake pipe pressure and operative to supply fluid under pressure to said brake pipe if brake pipe pressure reduces below that in said equalizing reservoir, valve means controlling communication through which fluid is adapted to be supplied from said brake valve device to said brake pipe but not from said mechanism to said brake pipe and operative upon an unfavorable track signal to close said communication and to effect a reduction in equalizing reservoir pressure, and double heading means controlling communication between said valve mechanism and brake pipe and operative in a double heading position to close said communication and in a normal position to open same.

4. In a locomotive brake equipment, in combination, a brake pipe, a brake valve device for supplying fluid under pressure to said brake pipe, an equalizing reservoir, a valve mechanism controlled by the opposing pressures in said equalizing reservoir and brake pipe and operative upon a reduction in equalizing reservoir pressure below brake pipe pressure to effect a corresponding reduction in brake pipe pressure and operative to supply fluid under pressure to said brake pipe if brake pipe pressure reduces below that in said equalizing reservoir, valve means controlling communications between said brake valve and brake pipe and between said valve mechanism and brake pipe and controlled manually for either opening same or closing same, and an automatic valve means also controlling communication between said brake pipe and brake valve device but not between said valve mechanism and brake pipe and operative upon an unfavorable track signal to close same and to vent fluid under pressure from said equalizing reservoir.

5. In a locomotive brake equipment, in combination, a brake pipe, a brake valve device for supplying fluid under pressure to said brake pipe, an equalizing reservoir, a valve mechanism controlled by the opposing pressures in said equalizing reservoir and brake pipe and operative upon a reduction in equalizing reservoir pressure below brake pipe pressure to effect a corresponding reduction in brake pipe pressure and operative to supply fluid under pressure to said brake pipe if brake pipe pressure reduces below that in said equalizing reservoir, a double heading cut-off valve controlling communication between said valve mechanism and brake pipe, a double head cock having a normal position for conditioning said cut-off valve to open said communication and a double heading position for conditioning said cut-off valve to close said communication, another cut-off valve controlling communication between said brake valve device and brake pipe, and valve mechanism normally conditioning the last named cut-off valve to open the communication controlled thereby and operative automatically upon an unfavorable track signal to effect operation thereof to close the communication controlled thereby and at the same time to vent fluid under pressure from said equalizing reservoir.

6. In a locomotive brake equipment, in combination, a brake pipe, a brake valve device for supplying fluid under pressure to said brake pipe, an equalizing reservoir, a valve mechanism controlled by the opposing pressures in said equalizing reservoir and brake pipe and operative upon a reduction in equalizing reservoir pressure below brake pipe pressure to effect a corresponding reduction in brake pipe pressure and operative to supply fluid under pressure to said brake pipe if brake pipe pressure reduces below that in said equalizing reservoir, a double heading cut-off valve controlling communication between said valve mechanism and brake pipe, a double head cock having a normal position for conditioning said cut-off valve to open said communication and a double heading position for conditioning said cut-off valve to close said communication, another cut-off valve controlling communication between said brake valve device and brake pipe, and valve mechanism normally conditioning the last named cut-off valve to open the communication controlled thereby and operative automatically upon an unfavorable track signal to effect operation thereof to close the communication controlled thereby and at the same time to vent fluid under pressure from said equalizing reservoir, communication between said brake valve device and brake pipe being also controlled by said double heading cut-off valve and closed thereby in the double heading position of said double heading cock.

7. In a fluid pressure brake, in combination, a brake pipe, a valve device controlled by the pressure of fluid in said brake pipe and an opposing pressure and operative to supply fluid under pressure to said brake pipe if brake pipe pressure becomes reduced below said opposing pressure, a valve controlling communication through which said supply of fluid to the brake pipe is effected, a piston operable by fluid under pressure supplied to a chamber for opening said valve and operative upon the venting of fluid under pressure from said chamber to close said valve, and a double heading cock having a normal position for supplying fluid under pressure to said chamber and a double heading position for venting fluid under pressure from said chamber.

8. In a fluid pressure brake, in combination, a brake pipe, a valve device controlled by the pressure of fluid in said brake pipe and an opposing pressure and operative to supply fluid under pressure to said brake pipe if brake pipe pressure reduces below said opposing pressure, and a cut-off valve device controlling communication through which said supply of fluid pressure to the brake pipe is effected, said cut-off valve device comprising a valve, a piston connected to said valve for operating same and subject on one face to pressure of fluid in said brake pipe and on the opposite face to the pressure of fluid in a chamber, said piston being operative upon venting of fluid under pressure from said chamber to effect closure of said valve, a spring in said chamber operative upon supply of fluid under pressure thereto for actuating said piston to open said valve, and a double heading cock having a normal position for supplying fluid under pressure to said chamber and movable therefrom to a double heading position for venting fluid under pressure from said chamber.

9. In a fluid pressure brake, in combination, a brake pipe, an equalizing reservoir, a brake valve device having one position for supplying fluid under pressure to said brake pipe and to said reservoir and movable to another position for venting fluid under pressure from said reservoir, a combined equalizing discharge valve mechanism and brake pipe maintaining valve device subject to the opposing pressures in the brake pipe and equalizing reservoir and operative upon a reduction in pressure in said equalizing reservoir to vent fluid under pressure from said brake pipe and operative to supply fluid under pressure to said brake pipe if brake pipe pressure reduces below that in said equalizing reservoir, a cut-off valve device controlling communication through which the venting of fluid under pressure from and the supplying of fluid under pressure to said brake pipe is effected by the operation of said mechanism, said cut-off valve device comprising a valve controlling said communication, a piston subject on one face to the pressure of fluid in said brake pipe and on the opposite face to the pressure of fluid in a chamber and being operative upon the venting of fluid under pressure from said chamber to actuate said valve to close said communication, a spring for actuating said valve to open said communication upon supply of fluid under pressure to said chamber, and a double heading cock having a normal position for supplying fluid under pressure to said chamber and movable therefrom to a double heading position for venting fluid under pressure from said chamber.

10. In a fluid pressure brake, in combination, a brake pipe, a brake valve device having a normal position for supplying fluid under pressure to said brake pipe for charging same and movable therefrom to an application position for effecting a reduction in brake pipe pressure, valve means controlled by track signals and responsive to an unfavorable signal to effect a reduction in brake pipe pressure, a cut-off valve device controlling communication through which fluid under pressure is supplied to the brake pipe by said brake valve device in said normal position and operative to close said communication upon operation of said valve means in response to an unfavorable track signal, means controlling communication through which fluid under pressure is vented from said brake pipe upon operation of either said brake valve device or valve means, and a double heading cock having a normal position for conditioning said means to open said communication and movable to a double heading position for effecting operation of said means to close said communication.

11. In a fluid pressure brake, in combination, a brake pipe, an equalizing reservoir, a combined equalizing discharge valve mechanism and maintaining valve device controlled by the opposing pressures of said equalizing reservoir and brake pipe and operative upon a reduction in equalizing reservoir pressure below that in said brake pipe to vent fluid under pressure from said brake pipe for effecting an application of brakes and operative to supply fluid under pressure to said brake pipe if brake pipe pressure reduces below that in said equalizing reservoir, a brake valve device having a normal position for supplying fluid under pressure to said brake pipe and to said reservoir and movable therefrom to an application position for effecting a reduction in pressure in said reservoir, valve means controlled by track signals and operable upon an unfavorable signal to also effect venting of fluid under pressure from said reservoir, a cut-off valve device controlling communication through which fluid under pressure is supplied by said brake valve device to said brake pipe and operable upon operation of said valve means to vent fluid under pressure from said equalizing reservoir and to close said communication, communication between said mechanism and brake pipe being independent of said cut-off valve device, another cut-off valve controlling the last named communication, and a double heading cock having a normal position for effecting operation of the last named cut-off valve device to open the communication controlled thereby and movable from said normal position to a double heading position to effect operation of the last named cut-off valve device to close the communication between said brake pipe and said mechanism.

12. In combination, a brake pipe, an equalizing reservoir, a combined equalizing discharge valve mechanism and maintaining valve device controlled by the opposing pressures of fluid in said equalizing reservoir and brake pipe and operative upon a reduction in equalizing reservoir pressure below that in said brake pipe to vent fluid under pressure from said brake pipe for effecting an application of brakes and operative to supply fluid under pressure to said brake pipe if brake pipe pressure reduces below that in said equalizing reservoir, a brake valve device having a normal position for supplying fluid under pressure to said brake pipe and movable to another position for cutting off the supply of fluid under pressure to said brake pipe and for effecting a reduction in pressure in said equalizing reservoir, valve means controlled by track signals and responsive to an unfavorable signal to effect venting of fluid under pressure from said equalizing reservoir, a cut-off valve device controlling communication through which fluid under pressure is supplied from said brake valve device to said brake pipe and controlled by said valve means and operative upon operation thereof in response to an unfavorable track signal to cut off the supply of fluid under pressure to said brake pipe, said valve mechanism being operative to vent fluid from said brake pipe and to supply fluid under pressure to said brake pipe independently of said cut-off valve device, another cut-off valve device controlling communication between said brake pipe and mechanism, and a double heading cock having a normal position for rendering the last named cut-off valve device operative to open the communication controlled thereby and movable from the normal position to a double heading position for effecting operation of said last named cut-off valve device to close the communication controlled thereby, said brake valve device being movable to an emergency position for venting fluid under pressure from said brake pipe by way of both of said cut-off valve devices and being operative in said emergency position to effect operation of both of said cut-off valve devices to their communication opening positions.

13. In a fluid pressure brake, in combination, a brake valve device for supplying fluid under pressure to said brake pipe and movable to a position for venting fluid under pressure from said brake pipe, a cut-off valve controlling communication through which said brake valve device is operative to supply fluid under pressure to and to vent fluid under pressure from said brake pipe, a piston connected to said valve and having at one side a chamber connected to said brake pipe and having at the opposite side a chamber adapted to be supplied with fluid under pressure, a spring in the last named chamber operative upon equalization of pressures in the two chambers to effect operation of said piston to open said valve, means conditionable to vent the chamber containing said spring for rendering said piston operable by brake pipe pressure to close said valve, said brake valve device being operable in the application position to connect the chambers at the opposite sides of said piston for equalizing the fluid pressure thereon to thereby render said spring operative to actuate said piston to open said cut-off valve.

14. In a fluid pressure brake, in combination, a brake pipe, a brake valve device having a normal position for supplying fluid under pressure to said brake pipe and having a service position for effecting the venting of fluid under pressure from said brake pipe at a service rate and having an emergency position for venting fluid under pressure from said brake pipe at an emergency rate, a communication through which the pressure of fluid in said brake pipe is controlled in said positions of said brake valve device, a valve for closing said communication, and a double heading cock having a normal position for effecting operation of said valve to open said communication and movable to a double heading position for effecting operation of said valve to close said communication, said brake valve device being operative in emergency position to effect operation of said valve to open said communication with said double heading cock in said double heading position.

15. In combination, a brake pipe, a brake valve device, a cut-off valve in a first chamber connected to said brake valve device for controlling communication between said chamber and a second chamber connected to said brake pipe, said brake valve device having a normal position for supplying fluid under pressure to said first chamber and past said valve to said second chamber and brake pipe and having an application position for venting fluid under pressure from said brake pipe through the second named chamber and past said valve and thence through the first named chamber, a piston subject on one face to brake pipe pressure in said second chamber and on the opposite face to the pressure of fluid in a third chamber, a spring in said third chamber operable upon the pressure of fluid in said third chamber being at least equal to that in said second chamber to effect operation of said piston to open said valve, a double heading cock having a normal position for supplying fluid at brake pipe pressure to said third chamber and movable to a double heading position for cutting off the supply of fluid under pressure to said third chamber and for venting fluid under pressure therefrom at a restricted rate, said piston being operative upon the venting of fluid under pressure from said third chamber to effect closure of said valve, said brake valve device being operative upon movement to said application position to connect said third chamber with said brake pipe to thereby render said spring operative to effect movement of said piston to open said valve regardless of the position of said double heading cock.

16. In combination, a brake pipe, an equalizing reservoir, a combined equalizing discharge valve mechanism and maintaining valve device controlled by the opposing pressures in said equalizing reservoir and brake pipe and operative upon a reduction in equalizing reservoir pressure below that in said brake pipe to vent fluid under pressure from said brake pipe for effecting an application of the brakes and operative to supply fluid under pressure to said brake pipe if brake pipe pressure reduces below that in said equalizing reservoir, a brake valve device having a normal position for supplying fluid under pressure to said brake pipe and to said equalizing reservoir and movable to a service application position for effecting a service reduction in pressure in said equalizing reservoir, said brake valve device being also movable to an emergency position for effecting emergency venting of fluid under pressure from said brake pipe, an application valve device controlled by track signals and responsive to an unfavorable signal to effect venting of fluid under pressure from said equalizing reservoir, a cut-off valve device operative upon said operation of said application valve device to close communication between said brake valve device and said brake pipe, said valve mechanism being connected to said brake pipe independently of said cut-off valve device, another cut-off valve device controlling communication between said brake pipe and said valve mechanism, a double heading cock controlling said other cut-off valve device and having a normal position for conditioning same to open communication between said brake pipe and valve mechanism and movable to a double heading position for effecting operation of said other cut-off valve device to close the communication between said brake pipe and mechanism, said brake valve device being operative in said emergency position to condition both of said cut-off valve devices to open the communications controlled thereby for thereby opening communication between said brake pipe and said brake valve device for rendering said brake valve device effective to effect emergency venting of fluid under pressure from said brake pipe.

GLENN T. McCLURE.